(12) United States Patent
Hehl

(10) Patent No.: US 8,221,107 B2
(45) Date of Patent: Jul. 17, 2012

(54) ELECTRICALLY DRIVEN MOLD CLAMPING UNIT ON AN INJECTION MOLDING MACHINE

(76) Inventor: Karl Hehl, Balingen (DE); Renate Keinath, legal representative, Balingen (DE)

( * ) Notice: Subject to any disclaimer, the term of this patent is extended or adjusted under 35 U.S.C. 154(b) by 0 days.

(21) Appl. No.: 13/122,979

(22) PCT Filed: Oct. 5, 2009

(86) PCT No.: PCT/EP2009/007092
§ 371 (c)(1),
(2), (4) Date: Jul. 19, 2011

(87) PCT Pub. No.: WO2010/040483
PCT Pub. Date: Apr. 15, 2010

(65) Prior Publication Data
US 2011/0293773 A1    Dec. 1, 2011

(30) Foreign Application Priority Data

Oct. 10, 2008  (DE) .................. 10 2008 051 285

(51) Int. Cl.
*B29C 45/66* (2006.01)

(52) U.S. Cl. ......... 425/143; 425/547; 425/548; 425/593

(58) Field of Classification Search .................. 425/143, 425/547, 548, 593
See application file for complete search history.

(56) References Cited

U.S. PATENT DOCUMENTS

| 5,580,584 A * | 12/1996 | Mussler et al. | 425/143 |
| 5,585,126 A * | 12/1996 | Heindl et al. | 425/593 |
| 5,620,646 A * | 4/1997 | Sparer et al. | 425/143 |
| 7,128,549 B2 * | 10/2006 | Terada | 425/143 |
| 2005/0255186 A1 * | 11/2005 | Hiraga | 425/542 |
| 2008/0203596 A1 * | 8/2008 | Okada | 425/144 |

FOREIGN PATENT DOCUMENTS

| DE | 4328844 A1 | 3/1995 |
| DE | 4334134 A1 | 4/1995 |
| DE | 102 23 627 | * 1/2003 |
| DE | 10 2004 042 744 A1 | 3/2006 |
| EP | 0658136 B1 | 6/1995 |
| JP | 11314257 A | 11/1999 |
| WO | 9404337 A1 | 3/1994 |

OTHER PUBLICATIONS

International Search Report PCT/EP2009/007092; Dated Feb. 16, 2010.

* cited by examiner

*Primary Examiner* — James Mackey
(74) *Attorney, Agent, or Firm* — Cantor Colburn LLP

(57) ABSTRACT

The invention relates to a mold clamping unit on a plastic injection molding machine, the unit having a clamping mechanism for opening and closing an injection mold, the mechanism having a servo motor as the drive motor (21). The drive motor drives at least one spindle drive (10) which has a spindle nut (12) and spindle which work together on a bearing position (14). A cooling system with cooling channels (25) is provided for removing heat from the clamping mechanism. A more efficient cooling of the spindle drive is achieved in that the cooling channels (25) penetrate the bearing position (14) of the spindle drive (10) and/or one of the cooling plates (23) assigned to the bearing position.

10 Claims, 2 Drawing Sheets

US 8,221,107 B2

ELECTRICALLY DRIVEN MOLD CLAMPING UNIT ON AN INJECTION MOLDING MACHINE

CROSS REFERENCE TO RELATED APPLICATIONS

The present application claims the priority of the German patent application 10 2008 051 285.0, filed on Oct. 10, 2008, whose disclosure is hereby expressly incorporated herein.

TECHNICAL FIELD

The invention relates to a mold clamping unit for injection moldsi on an injection molding machine for processing plastics and other plasticizable compounds such as ceramic or powdery compounds.

BACKGROUND

A mold clamping unit of this type is known from EP 0 658 136 B1 wherein a liquid-cooled servo motor is used to achieve a higher energy yield as a drive motor for a symmetrical force transmission to a toggle mechanism as well as for an energy-saving operation. Using the water as a cooling medium, heat given off by the electric servo motor can be recovered as energy and then used for tool tempering for example. The servo motor drives a rotationally-fixed spindle such that a favourable mechanical system is obtained.

A clamping unit for an injection molding machine in which a lubricant supply is provided to supply lubricant both to the joints of a toggle and to a spindle drive with spindle and spindle nut is known from DE 10 2004 042 744 A1.

BRIEF SUMMARY

The invention achieves a more efficient cooling of the spindle drive.

Since electromechanical drives on plastic injection molding machines are also increasingly being operated with very high dynamics both in regard to speed and acceleration, the heat generated by the interaction of spindle and nut in a mechanical drive of such a type is now dissipated directly from the spindle drive, comprising spindle, nut and bearing. The effect of the direct cooling is to extend the service life of both the spindle system and the bearing. This enhances the precision of the system as a whole owing to the even expansion which cannot be guaranteed when heat is only dissipated from the motor which is some way away from the bearing position that generates most of the heat. In this way, heat can be directly removed from the machine's bearing elements such as support elements or mold carriers and indirectly dissipated from the motor systems as well.

At the same time, by preferentially flange-connecting the motor to the bearing or cooling unit, so much heat can be removed from the motor that there is no need for a basically highly efficient liquid cooling of the motor itself, e.g. by means of water. The pure radiation of heat by cooling fins, or the significantly less efficient air cooling, is usually sufficient to cool the motor.

Of particular benefit is an arrangement of the bearing position within the support element for the clamping mechanism, because then the support element can guarantee accurate bearing and the cooling can also be effected through it. Of equal benefit is an arrangement of the cooling channels in an intermediate flange which isolates the bearing position and drive motor 'climatically' from one another and which, as a heat sink, can dissipate heat simultaneously in both directions, i.e. both from the motor and from the bearing position.

If extremely high precision is demanded, then besides the normal water cooling an exactly regulated temperature control can be beneficial.

Further advantages arise out of the dependent claims and out of the following description of a preferred embodiment.

BRIEF DESCRIPTION OF THE FIGURES

The invention is explained in more detail herein below by reference to the attached figures. In the figures.

DETAILED DESCRIPTION

The invention will now be explained in greater detail by reference to the attached drawings by way of example. The embodiments are however just examples which are not intended to restrict the inventive concept to a particular configuration.

Before the invention is described in detail it must be pointed out that it is not confined to the particular components of the device or the particular process steps, since said components and processes may vary. The terms used here are intended solely to describe special embodiments and are not employed restrictively. Moreover, if the singular or indefinite articles are used in the description or in the claims, this also refers to the plural of these elements unless the overall context unequivocally indicates to the contrary.

Figure 1:
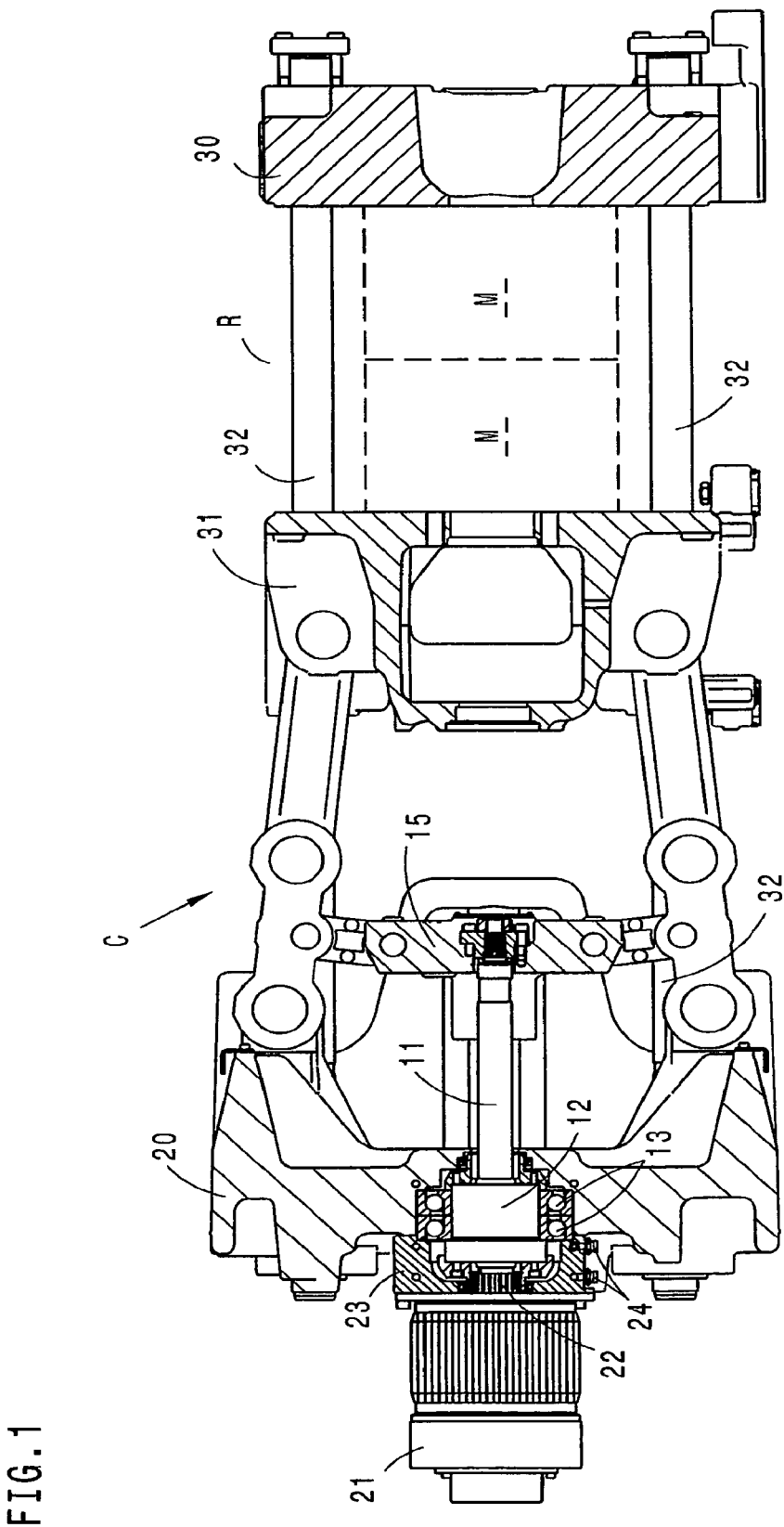
FIG. 1 shows a longitudinal section through a mold clamping unit with a toggle mechanism as clamping mechanism.

The figures depict a mold clamping unit for injection molds as the injection mold M that is suggested by the broken line in FIG. 1. The mold clamping unit is used on an injection molding machine for processing plastics and other plasticizable compounds such as ceramic or powdery compounds. A plasticizing unit which is not depicted is usually arranged on the right-hand side of the mold clamping unit in FIG. 1. The plasticizing unit plasticizes the plasticizable compound and injects it into a mold cavity of the injection mold M. In order to manufacture the injected parts, the injection mold M is opened and closed cyclically by a clamping mechanism C. For this purpose the injection mold M is accommodated in a mold-clamping space R which is arranged between a first, preferably stationary mold carrier 30 and a movable mold carrier 31. In FIG. 1 the injection mold is closed. The clamping mechanism C is supported on a support element 20, wherein in the embodiment an electromechanical clamping mechanism is provided which is configured here as a toggle mechanism. Other electromechanical drives are conceivable, for example by way of pure spindle drives. The actuation of clamping mechanism C opens and closes injection mold M cyclically while moving movable mold carrier 31 towards and away from the first mold carrier 30. Support element 20 and first mold carrier 30 are interconnected by force transmission elements such as tie bars 32. These tie bars may—but need not—serve to guide movable mold carrier 31 at the same time.

Figure 2:
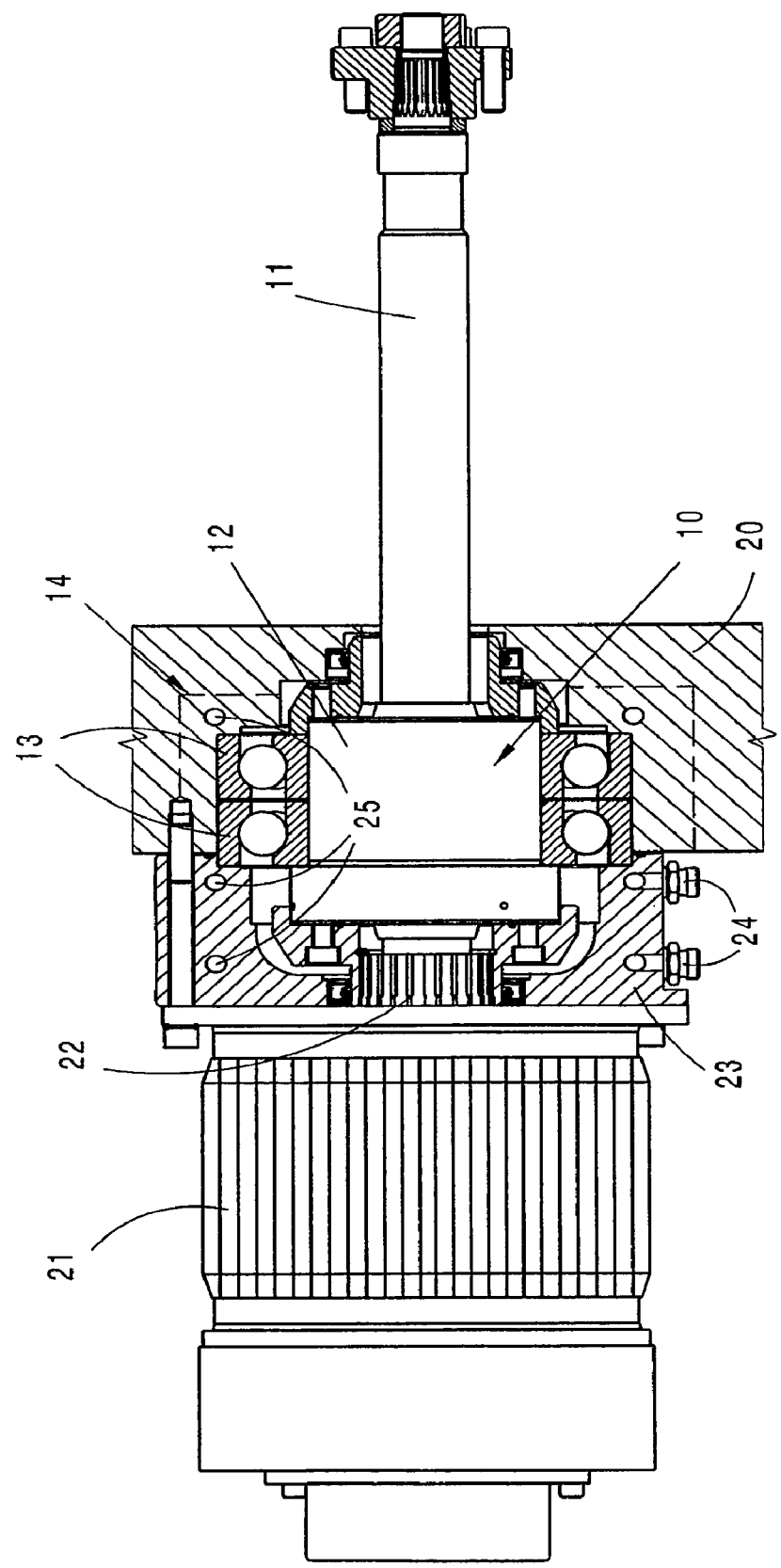
FIG. 2 shows an enlarged portion of the drive unit carried in support element 20 of FIG. 1 with drive motor and spindle drive

Clamping mechanism C has a servo motor as drive motor 21, with an AC synchronous motor or a three-phase synchronous motor acting as the servo motor for example. The servo motor drives a spindle drive 10 with a spindle nut 12 and a spindle 11. Spindle nut 12 and spindle engage in each other in the region of a bearing position 14 as said bearing position is shown in FIG. 2. The known spindle drives, i.e. for example threaded spindles, circular tracks or recirculating ballscrews, are possible for example as spindle drives. In order to move movable mold carrier 30, spindle 11 is interactively coupled with it. In the embodiment, the spindle is connected in a rotationally fixed manner to crosshead 15 of clamping mechanism C, but it could also be connected in a rotationally fixed manner to another point on the toggle mechanism or to another element of the mold clamping unit or of another clamping mechanism provided a cyclical movement of the movable mold carrier 31 is guaranteed. Instead of the triple-plate mold clamping unit shown in FIG. 1, a two-plate mold clamping unit in which the drive unit is disposed on stationary mold carrier 30 for example may also be used.

FIG. 2 depicts an enlarged portion of FIG. 1 in the region of bearing position 14. It clearly shows that this region is provided with cooling channels 25 which penetrate bearing position 14, i.e. the region in which spindle nut 12 is interactively coupled with spindle 11, and/or a cooling plate 23 that is assigned to the bearing plate. FIG. 2 further shows bearings 13 which in the embodiment carry spindle nut 12 such that it is rotationally turnable but not axially displaceable. Alternatively it is also conceivable to mount the nut in a rotationally fixed manner and to rotate the spindle. What is important is that the heat generated by the relative motion of spindle and spindle nut as they engage in one another is directly dissipated in the region of the bearing position of the two elements.

Drive motor 21 drives the rotating element of spindle 11 and spindle nut 12, i.e. spindle nut 12 in the embodiment, via drive shaft 22. In the embodiment, drive shaft 22 engages in an intermediate plate in the form of cooling plate 23 which is provided between drive motor 21 and bearing position 14 and which to this extent already creates a 'climatic' separation between drive motor 21 and spindle drive 10.

The direct cooling even allows such drives to be operated as high-performance drives with the highest dynamics in regard to both speed and acceleration. It is then in particular, but not only then, that the direct cooling contributes to a longer service life of both the spindle system and the bearing. This is accompanied by greater precision owing to the even expansion of the system. Since bearing position 14 is also usually in direct contact with or supported on other elements of the machine, as in the region of support element 20 in the embodiment, the heat can also be directly dissipated from the machine's carrying elements from said region, whereby in addition more heat can be dissipated from the motor systems themselves. By flange-connecting drive motor 21 to bearing position 14 and/or cooling plate 23, so much heat is simultaneously removed from drive motor 21 itself that the need for a highly efficient liquid cooling such as for example using water can be obviated. The pure radiation of heat by cooling fins, or by the significantly less efficient air cooling, is now usually sufficient. Nevertheless the described cooling of the bearing position can also be effected in conjunction with a liquid-cooled servo motor.

The drive motor is preferably a hollow-shaft motor because during a transfer of the toggle mechanism as a clamping mechanism C in FIG. 1 from the extended position to the retracted position, spindle 11 in FIG. 1 plunges to the left. However the drive of spindle nut 12 is effected outside the motor because a liquid cooling of the bearing position is more favourable than a liquid cooling inside the motor.

Spindle 11 also at least partially penetrates cooling plate 23. Where cooling plate 23 is referred to as a 'plate', this refers to its actual embodiment. Other non plate-shaped embodiments are conceivable provided the desired aim of cooling near to the bearing position is guaranteed.

If extremely high degrees of precision are required, then as well as normal liquid cooling, an accurately regulated temperature control may also be used so that bearing position 14 and/or cooling plate 23 are temperature-controlled as required.

In the embodiment, bearing position 14 carries the rotationally turnable and axially undisplaceable spindle nut 12 in bearing 13. Cooling is effected through cooling channels 25, with the coolant being supplied via cooling connections 24. Bearing position 14 is advantageously arranged mainly in support element 20. As a result, the metal support element itself forms bearing position 14 which is indicated in FIG. 1 by the broken line, and in so doing serves the cooling at the same time. It is an advantage if an oil or other temperature-conducting material is used as a slip agent and lubricant because then cooling can be more easily transmitted from bearings 13 and bearing position 14 inward to the nut and spindle.

It goes without saying that this description is susceptible to a very wide variety of modifications and adaptations which fall within the scope of equivalents to the appended claims.

The invention claimed is:

1. Mold clamping unit for injection molds on an injection molding machine for processing plastics and other plasticizable compounds such as ceramic or powdery compounds, comprising
   a first mold carrier,
   a movable mold carrier that can move relative to the first mold carrier which together with the first mold carrier creates a mold clamping space to receive an injection mold between the movable mold carrier and the first mold carrier,
   a support element for an electromechanical clamping mechanism for the cyclical opening and closing of the injection mold as the movable mold carrier moves towards and away from the first mold carrier,
   wherein the clamping mechanism has a servo motor as drive motor,
   which has at least one spindle drive with a spindle interacting with a spindle nut at a bearing position for a relative motion between the spindle and the spindle nut, said spindle being operatively coupled with the movable mold carrier so as to move it,
   a liquid cooling with cooling channels for dissipating heat from the clamping mechanism,
   wherein the cooling channels penetrate at least one of the bearing position, wherein the spindle and the spindle nut operate together during the relative motion, of the spindle drive or a cooling plate, said cooling plate disposed adjacent to the bearing position.

2. Mold clamping unit according to claim 1, wherein the drive motor itself is air-cooled.

3. Mold clamping unit according to claim 1, wherein the drive motor is a hollow-shaft motor.

4. Mold clamping unit according to claim 1, wherein the spindle passes through the cooling plate.

5. Mold clamping unit according to claim 1, further including a temperature control adjacent the cooling channels for regulating the temperature of at least one of the bearing position or the cooling plate.

6. Mold clamping unit according to claim 1, wherein at least one of the bearing position or the cooling plate indirectly cools the drive motor.

7. Mold clamping unit according to claim 1, wherein the clamping mechanism comprises at least one toggle mechanism.

8. Mold clamping unit according to claim 1, wherein the spindle is connected in a rotationally fixed manner with the clamping mechanism.

9. Mold clamping unit according to claim 1, wherein the bearing position carries the rotationally turnable and axially undisplaceably mounted spindle nut.

10. Mold clamping unit according to claim 1, wherein the bearing position is arranged mainly in the support element.

* * * * *